(12) United States Patent
Kim et al.

(10) Patent No.: US 11,695,111 B2
(45) Date of Patent: Jul. 4, 2023

(54) SULFUR-CARBON COMPOSITE, PREPARATION METHOD THEREOF, AND LITHIUM SECONDARY BATTERY COMPRISING SAME

(71) Applicant: LG CHEM, LTD., Seoul (KR)

(72) Inventors: Eui Tae Kim, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 515 days.

(21) Appl. No.: 16/647,892

(22) PCT Filed: Oct. 24, 2018

(86) PCT No.: PCT/KR2018/012662
§ 371 (c)(1),
(2) Date: Mar. 17, 2020

(87) PCT Pub. No.: WO2019/103326
PCT Pub. Date: May 31, 2019

(65) Prior Publication Data
US 2020/0220169 A1    Jul. 9, 2020

(30) Foreign Application Priority Data
Nov. 24, 2017    (KR) .......................... 10-2017-0158293

(51) Int. Cl.
| | | |
|---|---|---|
| H01M 4/38 | (2006.01) |
| H01M 4/139 | (2010.01) |
| H01M 4/36 | (2006.01) |
| H01M 4/583 | (2010.01) |
| H01M 10/0525 | (2010.01) |
| H01M 4/02 | (2006.01) |

(52) U.S. Cl.
CPC ............ *H01M 4/38* (2013.01); *H01M 4/139* (2013.01); *H01M 4/362* (2013.01); *H01M 4/583* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | |
|---|---|---|
| 2014/0342233 A1 | 11/2014 | Guo et al. |
| 2015/0340688 A1 | 11/2015 | Rhee et al. |
| 2016/0185600 A1 | 6/2016 | Sotowa et al. |
| 2016/0248087 A1 | 8/2016 | Kim et al. |
| 2017/0317340 A1 | 11/2017 | Nishikawa |
| 2018/0138503 A1 | 5/2018 | Kim et al. |
| 2020/0274154 A1* | 8/2020 | Kim .................. H01M 4/362 |

FOREIGN PATENT DOCUMENTS

| | | |
|---|---|---|
| CN | 103094535 A | 5/2013 |
| CN | 103296272 A | 9/2013 |
| CN | 103560232 A | 2/2014 |
| CN | 103959517 A | 7/2014 |
| CN | 107108214 A | 8/2017 |
| EP | 1641061 A1 | 3/2006 |
| JP | 2020-533768 A | 11/2020 |
| KR | 10-0864199 B1 | 10/2008 |
| KR | 10-2012-0103378 A | 9/2012 |
| KR | 10-2015-0008327 A | 1/2015 |
| KR | 10-2015-0045363 A | 4/2015 |
| KR | 10-2015-0135961 A | 12/2015 |
| KR | 10-2016-0023845 A | 3/2016 |
| KR | 10-2016-0037084 A | 4/2016 |
| KR | 10-2016-0061033 A | 5/2016 |
| KR | 10-2017-0032190 A | 3/2017 |
| WO | WO 2014/085992 * | 6/2014 |
| WO | WO 2017/079976 A1 | 5/2017 |
| WO | WO 2017/081182 A1 | 5/2017 |
| WO | WO 2019/098733 A1 | 5/2019 |

OTHER PUBLICATIONS

Extended European Search Report, dated Sep. 24, 2020, for European Application No. 18880430.6.
Wang et al., "Effects of porous structure of carbon hosts on preparation and electrochemical performance of sulfur/carbon composites for lithium—sulfur batteries", J Nanopart Res, 2016 (published online Jan. 13, 2016), vol. 18, No. 19, pp. 1-9 (9 pages).
Yu et al., "Three-dimensionally ordered, ultrathin graphitic-carbon frameworks with cage-like mesoporosity for highly stable Li-S batteries", Nano Research, 2017, vol. 10. No. 7, pp. 2495-2507 (13 pages).
Zhang et al., "Core-shell meso/microporous carbon host for sulfur loading toward applications in lithium-sulfur batteries", Journal of Energy Chemistry, 2014, Vo. 23, pp. 308-314 (7 pages).
International Search Report (PCT/ISA/210) issued in PCT/KR2018/012662, dated Apr. 24, 2019.

* cited by examiner

Primary Examiner — Anca Eoff
(74) Attorney, Agent, or Firm — Birch, Stewart, Kolasch & Birch, LLP

(57) ABSTRACT

A sulfur-carbon composite including porous carbon material, and sulfur, wherein at least a portion of an inside and a surface of the porous carbon material coated with the sulfur, the sulfur-carbon composite has a pore volume of 0.180 $cm^3/g$ to 0.300 $cm^3/g$, and the sulfur-carbon composite has an average pore size of 40.0 nm to 70.0 nm, and a method of manufacturing the same. Also, a method of manufacturing a sulfur-carbon composite, which includes (a) mixing a porous carbon material with sulfur particles, wherein the sulfur particles have a particle size of 1 nm to 1 µm using a Henschel mixer; and (b) drying the resulting mixture of (a).

14 Claims, 6 Drawing Sheets

[Figure 1]
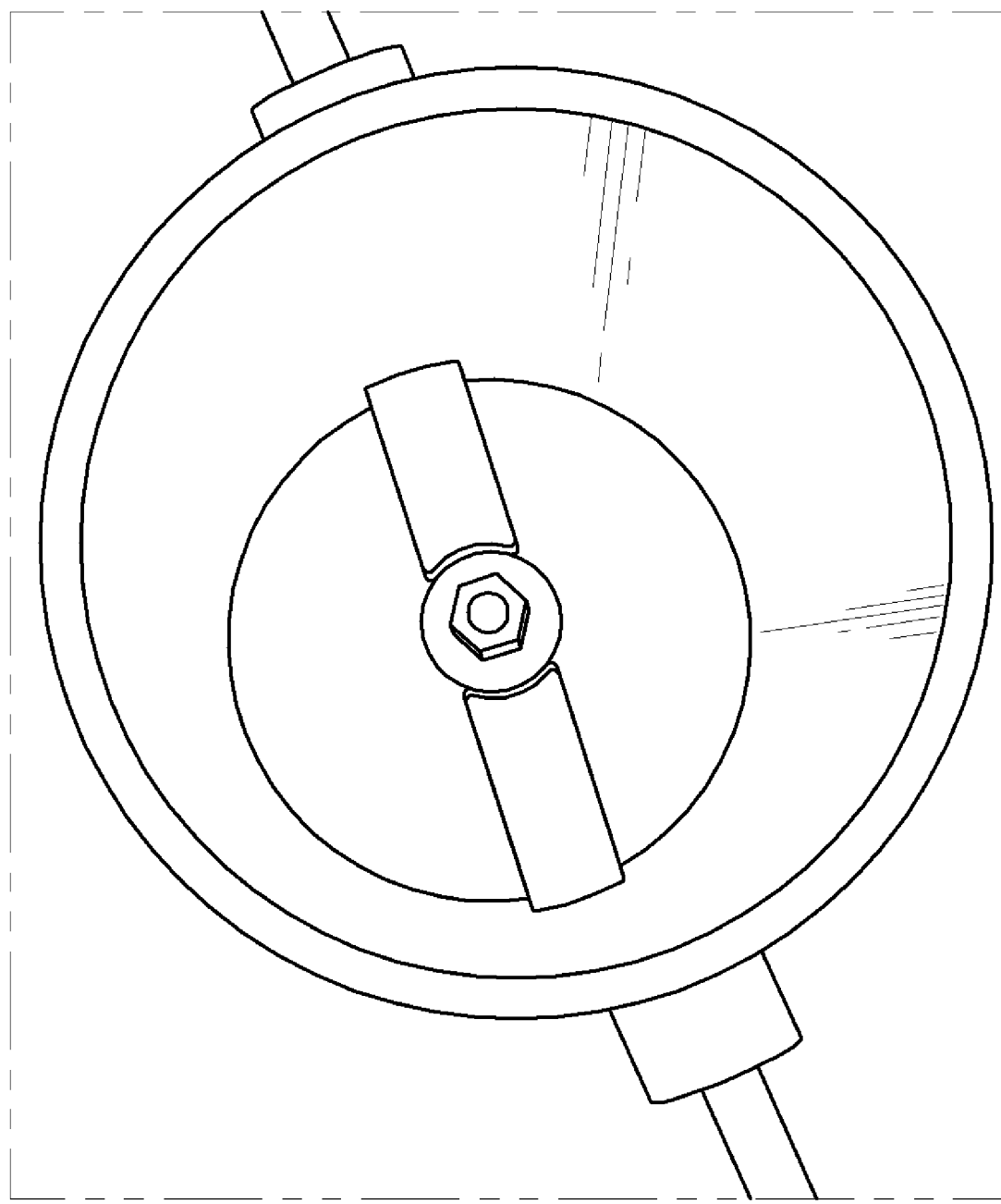

[Figure 2]
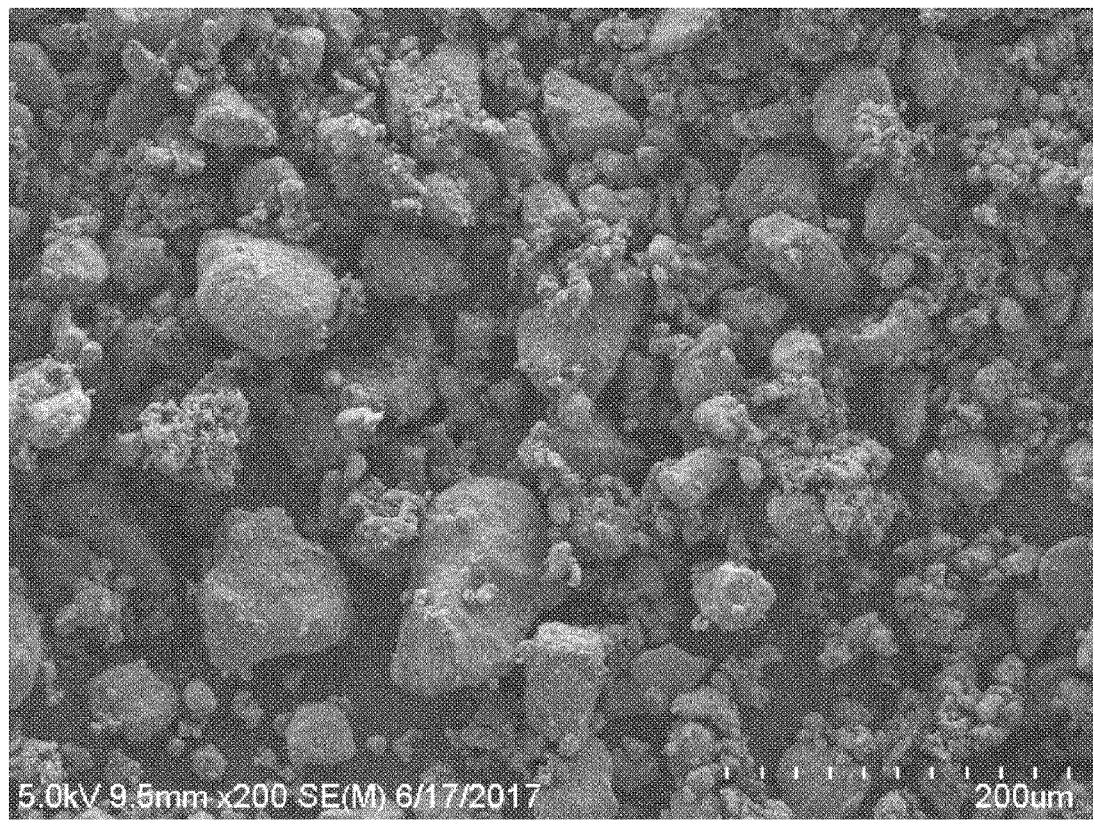

[Figure 3]
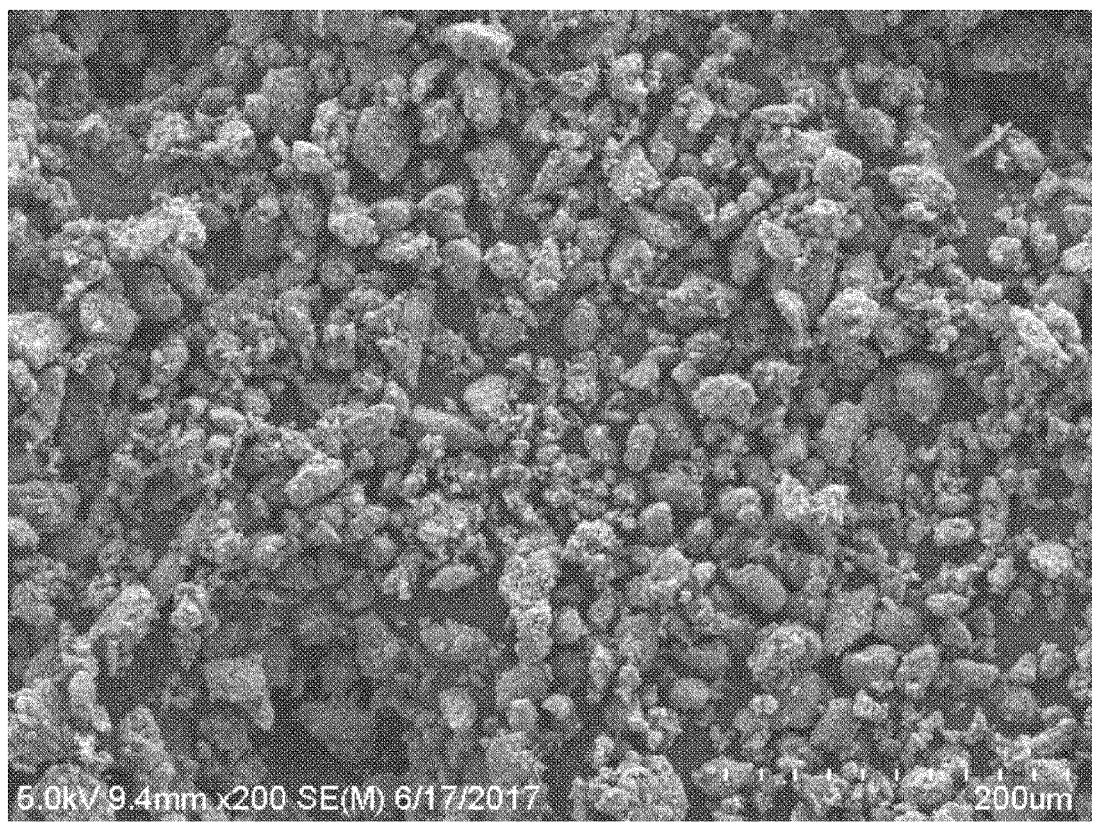

[Figure 4]
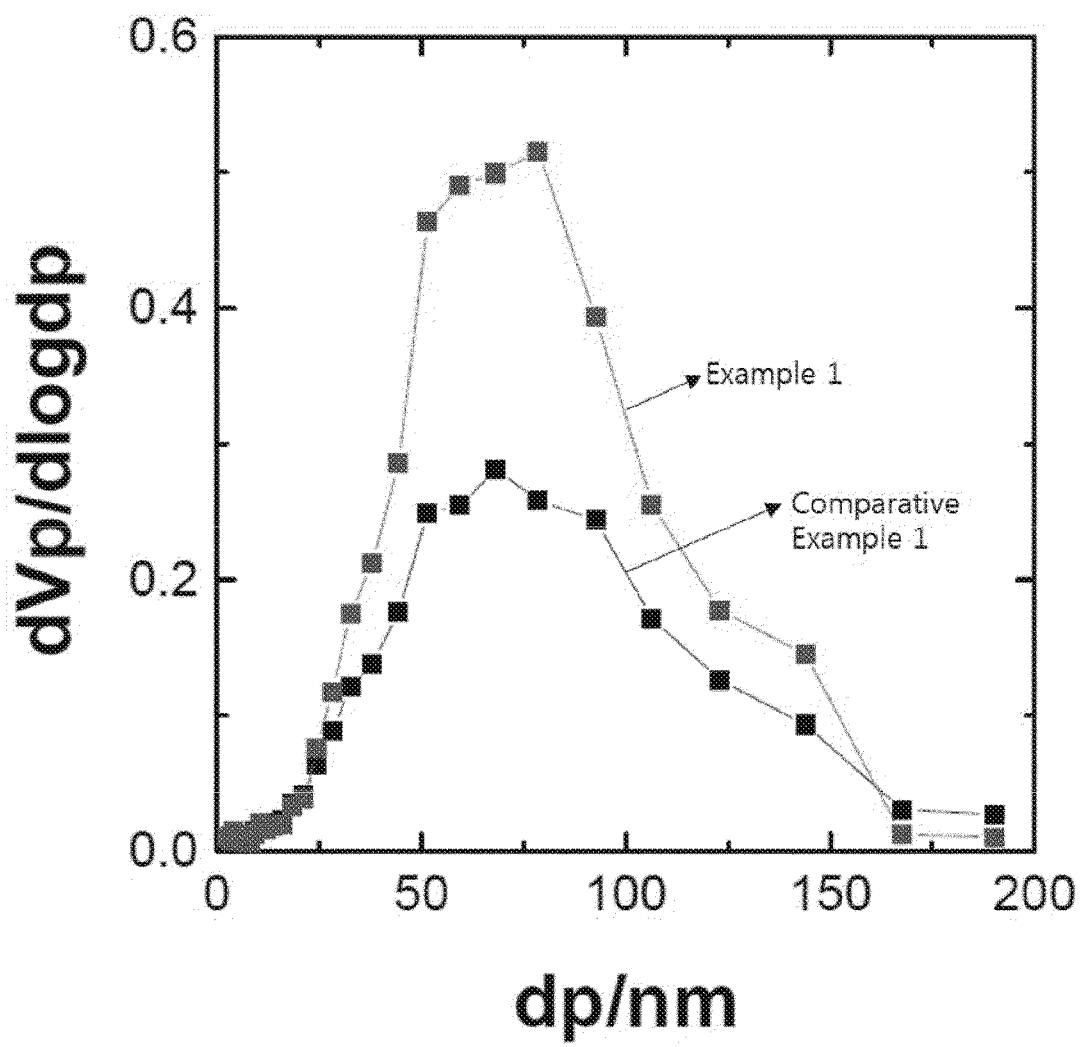

[Figure 5]
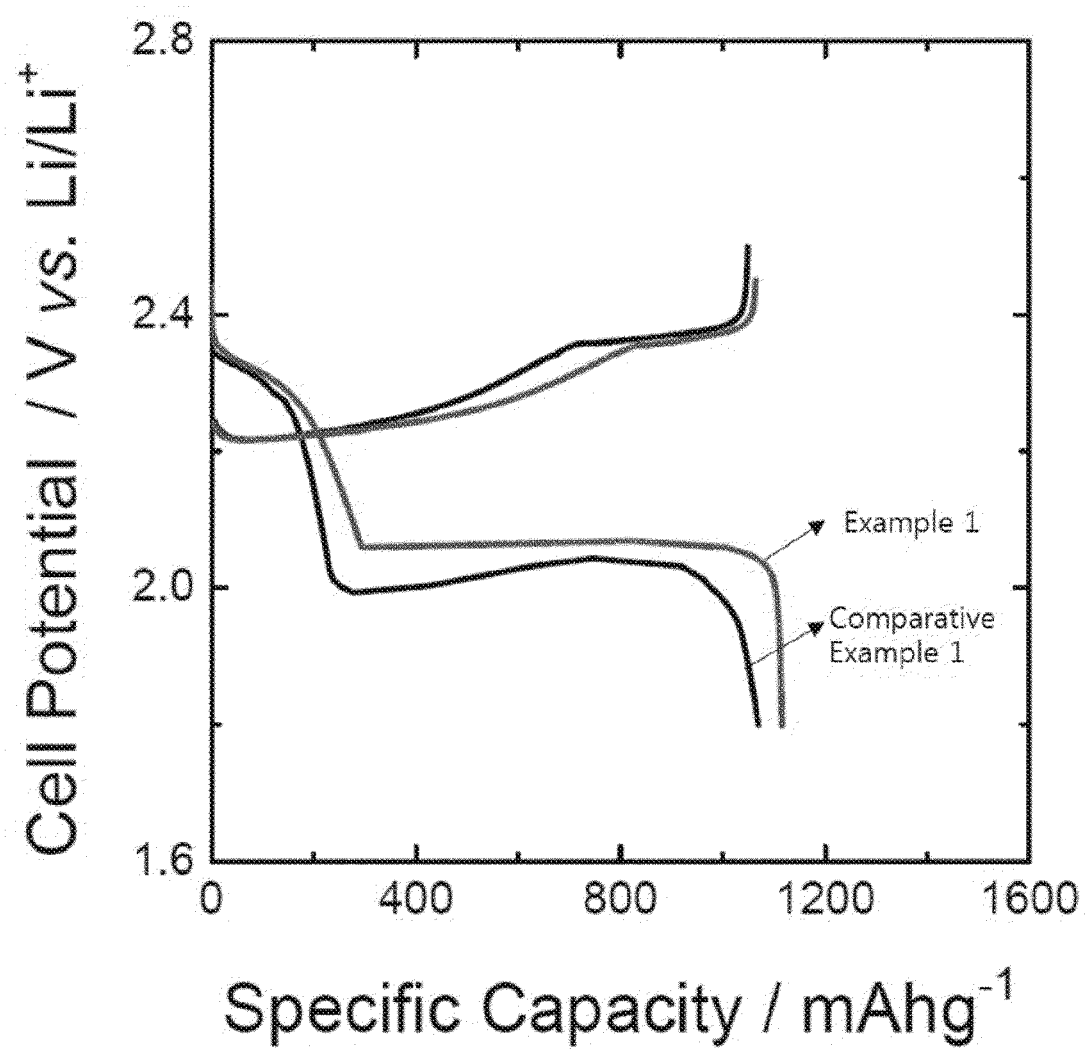

【Figure 6】
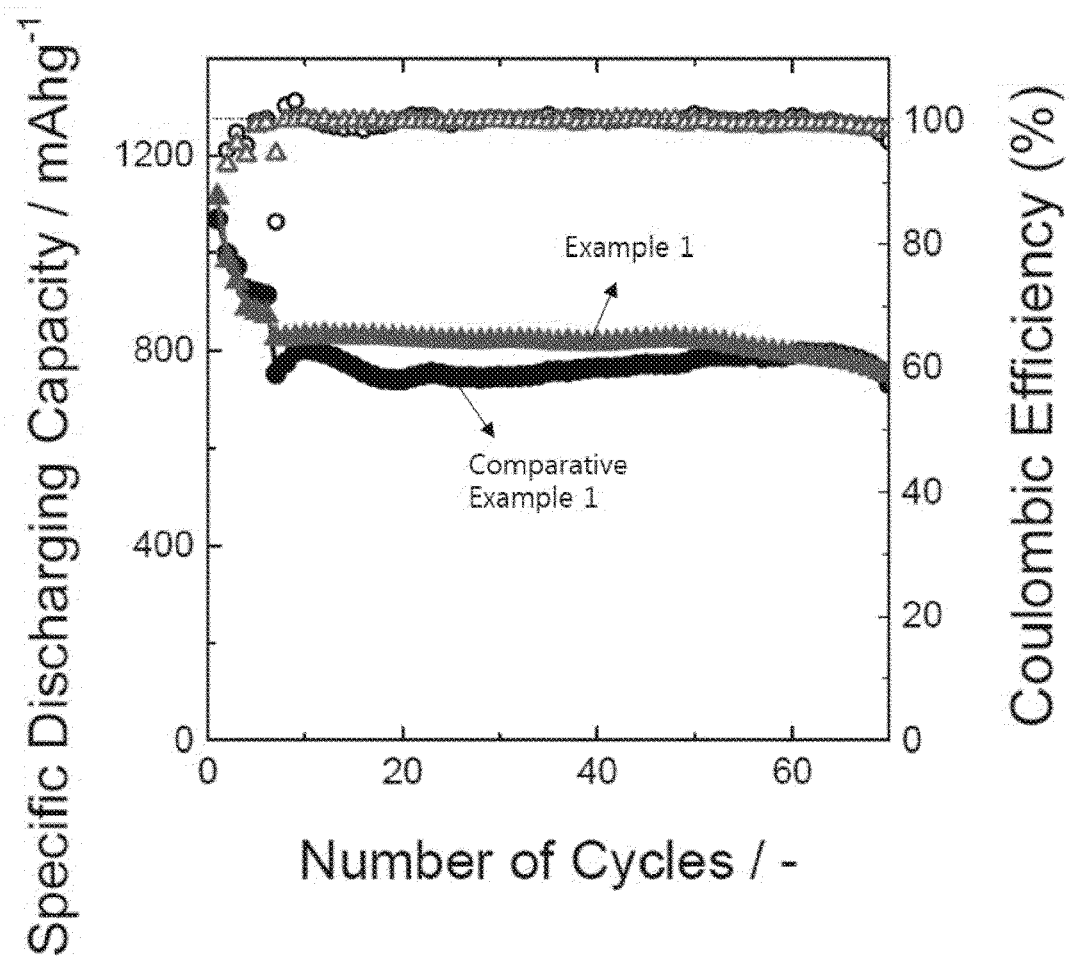

SULFUR-CARBON COMPOSITE, PREPARATION METHOD THEREOF, AND LITHIUM SECONDARY BATTERY COMPRISING SAME

TECHNICAL FIELD

This application claims priority to Korean Patent Application No. 10-2017-0158293 filed on Nov. 24, 2017 in the Korean Intellectual Property Office (KIPO), the entire contents of which are hereby incorporated by reference.

The present invention relates to a sulfur-carbon composite, a method of manufacturing the same, and a lithium secondary battery comprising the same.

BACKGROUND ART

Secondary batteries are electric storage systems that can be repeatedly charged and discharged unlike primary batteries which can be discharged only once. Since the 1990s, the secondary batteries have established themselves as the main parts of portable electronic devices. In particular, since lithium ion secondary batteries were commercialized by Sony in 1992, they have led to the information age in the field of the core parts for portable electronic devices such as smart phones, digital cameras, notebook computers, and the like.

In recent years, as the application area of the lithium ion secondary batteries have expanded gradually, there is a rapidly growing demand for the lithium ion secondary batteries, which comprise middle-sized batteries used in the fields such as cleaners, power sources for power tools, electric bicycles, electric scooters, and high-capacity batteries used in the fields such as electric vehicle (EVs), hybrid electric vehicles (HEVs), plug-in hybrid electric vehicles (PHEVs), various robots, and large-sized electric storage systems (ESSs).

However, the lithium secondary batteries having the most excellent characteristics among the secondary batteries commercially available thus far also have several problems in that they are difficult to be actively used in transport systems such as electric vehicles, PHEVs, and the like. One of the biggest problems is a capacity limit.

A lithium secondary battery is basically composed of materials such as a cathode, an electrolyte, an anode, and the like. Among theses, because the battery capacities are decided by cathode and anode materials, the lithium ion secondary battery has restrictions to the capacities due to the limitation of the materials such as the cathode and the anode. In particular, because secondary batteries used in the areas such as electric vehicles, PHEVs, and the like have to last as possible as they can after they are charged once, the discharge capacity of the secondary batteries is considered to be of very importance. What is pointed out as one of the biggest limitations to selling the electric vehicles is that they have a very shorter mileage lifespan than conventional gasoline engine automobiles after they are charged once.

Despite many efforts to do so, the limitations to the capacities of such lithium secondary batteries may not be completely solved due to the limitations to the structures and materials of the lithium secondary batteries. Therefore, to basically solve the problems regarding the capacities of the lithium secondary batteries, there is a demand for development of advanced secondary batteries which can reach beyond the boundaries of the conventional secondary batteries.

A lithium-sulfur secondary battery is a novel high-capacity and inexpensive battery system that may overcome the battery capacity limits determined by the intercalation/deintercalation of lithium ions to/from metal oxides and graphite in a lamellar structure, a phenomenon of which is called a basic principle for the conventional lithium ion secondary batteries, and may lead to replacement of transition metals, cost cutting, etc.

A lithium-sulfur secondary battery has a theoretical capacity of approximately 1,675 mAh/g, which is derived from a conversion of lithium ions and sulfur ($S_8+16Li^+ +16e^- \rightarrow 8Li_2S$) in a cathode, and an anode uses a lithium metal (theoretical capacity: 3,860 mAh/g), thereby making it possible to manufacture battery systems with ultra-high capacity. Also, because the lithium-sulfur secondary battery has a discharge voltage of approximately 2.2 V, it theoretically has an energy density of 2,600 Wh/kg on the basis of the amounts of cathode and anode active materials. This value is 6 to 7 times higher than the theoretical energy densities (400 Wh/kg) of typical lithium secondary batteries ($LiCoO_2$/graphite) in which metal oxides and graphite in a lamellar structure are used.

Since the fact that the battery performance may be remarkably improved through the nano-composite formation was known by 2010, the lithium-sulfur secondary batteries have emerged as novel high-capacity, environmentally-friendly and inexpensive lithium secondary batteries, and made intensive studies of next-generation battery systems all over the world.

One of the main problems of the lithium-sulfur secondary batteries found thus far is that a electrochemical reaction does not easily occur in an electrode because the electrical conductivity of sulfur is approximately $5.0 \times 10^{-14}$ S/cm, which is close to those of non-conductive materials, and the actual discharge capacity and voltage are much lower than theoretical discharge capacity and voltage due to the very high overvoltage. In the beginning, the researchers endeavored to improve the performance using methods such as mechanical ball milling using sulfur and carbon, surface coating using carbon, and the like, but had no significant effects.

To effectively solve the problem in which an electrochemical reaction is restricted due to the electrical conductivity, it is necessary to reduce the size of particles to several tens of nanometers or less and treat surfaces of the particles with a conductive material, as in examples of $LiFePO_4$ as another cathode active material (electrical conductivity: $10^{-9}$ S/cm to $10^{-10}$ S/cm). For this purpose, various chemical methods (melt impregnation into nano-sized porous carbon nanostructures or metal oxide structures), physical methods (high energy ball milling), and the like are reported.

Another main problem regarding the lithium-sulfur secondary batteries is dissolution of lithium polysulfides, which are intermediates of sulfur produced during a discharge process, in an electrolyte. As a discharge process proceeds, sulfur ($S_8$) continuously reacts with lithium ions to undergo continuous conversion of phases: $S_8 \rightarrow Li_2S_8 \rightarrow (Li_2S_6) \rightarrow Li_2S_4 \rightarrow Li_2S_2 \rightarrow Li_2S$. Among theses, $Li_2S_8$, $Li_2S_4$ (lithium polysulfide), and the like, all of which are in the form of a chain in which sulfur is aligned in a long line, has a property of being easily dissolved in conventional electrolytes used in the lithium ion batteries. When such a reaction occurs, the reversible cathode capacity may be remarkably reduced, and dissolved lithium polysulfides may spread to an anode, thereby causing various side reactions therein.

In particular, the lithium polysulfides cause a shuttle reaction during a charge process. As a result, the charge/discharge efficiency may be severely degraded due to a continuous increase in charge capacity. In recent years, various methods have been proposed to solve these problems, and may be mainly divided into a method of improving an electrolyte, a method of improving a surface of an anode, a method of improving characteristics of a cathode, and the like.

The method of improving an electrolyte is a method of suppressing the dissolution of polysulfides in an electrolyte using new electrolytes such as a functional liquid electrolyte having a novel composition, a polymer electrolyte, an ionic liquid, and the like, or suppressing a shuttle reaction to the maximum extent by controlling a dispersion rate of polysulfides into an anode under the control of viscosity, and the like.

Studies have been actively conducted to improve characteristics SEI formed on a surface of an anode in order to control a shuttle reaction. In this case, the method comprises a method of improving an electrolyte by introducing an electrolyte additive such as $LiNO_3$ to form an oxide film (such as $Li_xNO_y$, $Li_xSO_y$, etc.) on a surface of a lithium anode, a method of forming a thick functional SEI layer on a surface of a lithium metal, and the like.

Finally, the method of improving characteristics of a cathode comprises a method of forming a coating layer on surfaces of cathode particles to prevent the dissolution of the polysulfides or adding a porous material capable of scavenging the dissolved polysulfides, and the like. Typically, a method of coating a surface of a cathode structure containing sulfur particles with a conductive polymer, a method of coating a surface of a cathode structure with a metal oxide into which lithium ions are conducted, a method of adding a porous metal oxide, which may absorb a large amount of lithium polysulfides, has a wide specific surface area and contains high pores, to a cathode, a method of attaching a functional group, which may adsorb the lithium polysulfides, to a surface of a carbon structure, a method of surrounding sulfur particles with graphene or graphene oxides, and the like have been proposed.

A sulfur/carbon composite that is a cathode active material for lithium sulfur batteries has a great influence on the reactivity and cycling stability of the cathode, depending on the shape, structure, specific surface area, pore volume, and the like of the composite. A degree of contact of carbon with sulfur may be maximized, and the electric conductivity and lithium ion conductivity may be ensured with increasing specific surface area and pore volume, thereby making it possible to expect driving of high-performance lithium-sulfur batteries.

Therefore, there is a need to develop a process of manufacturing a sulfur/carbon composite, which satisfies the requirements, is inexpensive, and may be produced in large quantities.

In this regard, a conventional process of manufacturing a sulfur-carbon composite involves dry-mixing sulfur and carbon powder by means of a ball milling process, followed by liquid impregnation of sulfur by heating. In this case, the process has to be still improved because, when the sulfur and carbon are mixed by means of the ball milling process, carbon particles are pulverized to reduce the size of the particles, resulting in decreased pore volume.

Accordingly, there is a need for new techniques to solve these problems in complex ways and improve the performance of the lithium-sulfur batteries.

PRIOR-ART DOCUMENTS

Patent Documents

Patent Document 1: Korean Patent Publication No. 10-2015-0135961 (Dec. 4, 2015) titled "A Method for Preparing Sulfur-carbon composite by Dual Dry Complexation"
Patent Document 2: Korean Patent Publication No. 10-2016-0037084 (Apr. 5, 2016) titled "Sulfur-Carbon Nanotube Complex, Method of Preparing the Same, Cathode Active Material for Lithium-Sulfur Battery Including the Same and Lithium-Sulfur Battery Including the Same"

DISCLOSURE

Technical Problem

To solve the above problems, the present inventors have found that a sulfur-carbon composite may be uniformly manufactured without reducing a carbon particle size and a pore volume when sulfur and carbon are mixed using a Henschel mixer during the manufacture of the sulfur-carbon composite applicable to a cathode for lithium-sulfur batteries. Therefore, the present invention has been completed based on these facts.

Therefore, an object of the present invention is to provide a sulfur-carbon composite, which exhibits the initial discharge capacity and high efficiency/capacity improved compared to conventional sulfur-carbon composites when the sulfur-carbon composite is manufactured without reducing a size and a pore volume of carbon particles using a Henschel mixer and applied to an electrode, and a method of manufacturing the same.

Technical Solution

To solve the above problems, according to one aspect of the present invention, there is provided a sulfur-carbon composite comprising a porous carbon material; and sulfur,
wherein at least a portion of an inside and a surface of the porous carbon material is coated with the sulfur,
the sulfur-carbon composite has a pore volume of 0.180 $cm^3/g$ to 0.300 $cm^3/g$, and
the sulfur-carbon composite has an average pore size of 40.0 nm to 70.0 nm.

According to another aspect of the present invention, there is provided a method of manufacturing a sulfur-carbon composite, which comprises:
(a) mixing a porous carbon material with sulfur particles, wherein the sulfur particles have a particle size of 1 nm to 1 μm using a Henschel mixer; and
(b) drying the resulting mixture of (a).

According to still another aspect of the present invention, there is provided a cathode for lithium-sulfur batteries comprising the sulfur-carbon composite.

According to yet another aspect of the present invention, there is provided a lithium-sulfur battery comprising the cathode; an anode; and an electrolyte.

Advantageous Effects

When sulfur and carbon material are mixed using a Henschel mixer to manufacture a sulfur-carbon composite according to the present invention, the sulfur-carbon composite can be uniformly manufactured without reducing a size and a pore volume of carbon particles, and has an effect of exhibiting the initial discharge capacity and high efficiency/capacity, which are improved when the sulfur-carbon composite manufactured by the process is applied as a cathode active material for lithium-sulfur batteries. Therefore, the sulfur-carbon composite of the present invention has advantages in that this process is simpler than a conventional ball milling process, and it can be easily mass-produced.

DESCRIPTION OF DRAWINGS

FIG. 1 shows an image of an inner structure of a Henschel mixer according to the present invention.

FIG. 2 is an SEM image obtained by taking a picture of a sulfur-carbon composite according to an example of the present invention.

FIG. 3 is an SEM image obtained by taking a picture of a sulfur-carbon composite according to a comparative example of the present invention.

FIG. 4 is a graph illustrating the results of measuring pore sizes of the sulfur-carbon composites according to the example and comparative example of the present invention.

FIG. 5 is a graph illustrating the discharge capacities of lithium-sulfur batteries manufactured with the sulfur-carbon composites according to the example and comparative example of the present invention.

FIG. 6 is a graph illustrating the lifespan characteristics of the lithium-sulfur batteries manufactured with the sulfur-carbon composites according to the example and comparative example of the present invention.

BEST MODE

Hereinafter, the present invention will be described in further detail with reference to the accompanying drawings so that a person having ordinary skill in the art to which the present invention belongs can easily put the invention into practice. However, it should be understood that the present invention may be embodied in various forms, but is not intended to be limiting in this context.

In the drawings, the description of parts regardless of the detailed description will be omitted to describe the present invention more clearly. Throughout this specification, like parts are designated by like reference numerals. Also, sizes and relative sizes of elements in the drawings are not shown in actual scales, and may be exaggerated or diminished for the sake of convenience of description.

The terms and words used in this specification and the claims are not to be construed as having common and dictionary meanings but are construed as having meanings and concepts corresponding to the technical spirit of the present invention in view of the principle that the present inventor can properly define the concepts of the terms and words in order to describe his/her invention with the best method.

The term "composite" used in this specification refers to a material that exhibits more effective functions while combining two or more materials to form physically and chemically different phases.

A lithium-sulfur battery uses sulfur and a lithium metal as a cathode active material and an anode active material, respectively. When the lithium-sulfur battery is discharged, an oxidation reaction of lithium occurs in the anode, and a reduction reaction of sulfur occurs in the cathode. In this case, the reduced sulfur binds to lithium ions moving from the anode, and converted to lithium polysulfides, which are finally subjected to a reaction for forming lithium sulfide.

The lithium-sulfur battery has advantages in that the lithium-sulfur battery has a very high theoretical energy density, compared to conventional lithium secondary batteries, and sulfur used as the cathode active material is rich in resources and inexpensive, thereby reducing the manufacturing costs of batteries. Therefore, the lithium-sulfur battery has come into the spotlight as one of next-generation batteries.

In spite of these advantages, the lithium-sulfur battery has a difficulty in realizing the entire theoretical energy density when the lithium-sulfur battery is actually driven due to the low electrical conductivity of sulfur as the cathode active material and the low ionic conduction characteristics of lithium ions.

To improve the electrical conductivity of sulfur, a method of forming a composite with a conductive material such as carbon, a polymer, and the like, and coating the composite is used. In various methods, because a sulfur-carbon composite is effective in improving the electrical conductivity of a cathode, the sulfur-carbon composite is most often used as the cathode active material, but is not sufficient in terms of the charge/discharge capacity and efficiency. The capacity and efficiency of the lithium-sulfur battery may depend on quantities of lithium ions transferred to the cathode. Therefore, to manufacture batteries with high capacity and high efficiency, it is important to promote the transfer of the lithium ions into the sulfur-carbon composite.

Sulfur-Carbon Composite

Accordingly, to secure the reactivity between a sulfur-carbon composite and a electrolyte solution and an effect of improving the capacity and efficiency characteristics of a lithium-sulfur battery in the present invention, a sulfur-carbon composite in which the inside and surface of a porous carbon material is coated with sulfur is provided. The inside of the porous carbon material is intended to have meanings encompassing the inside of pores in the porous carbon material.

The sulfur-carbon composite of the present invention comprises a porous carbon material, wherein at least a portion of an inside and a surface of the porous carbon material is coated with the sulfur.

The porous carbon material of the sulfur-carbon composite according to the present invention provides a framework in which sulfur that is a cathode active material may be uniformly and stably fixed, and is allowed to compensate for the electrical conductivity of sulfur in order to smoothly perform an electrochemical reaction.

The porous carbon material is in a spherical, rod-type, acicular, platy, tubular, or bulky shape, and thus may be used without limitation as long as the porous carbon material is commonly used in lithium-sulfur batteries.

The porous carbon material has a porous structure or a high specific surface area, and thus may be used as long as the porous carbon material is commonly used in the related art. For example, the porous carbon material may comprise one or more selected from the group consisting of graphite; graphene; carbon blacks such as denka black, acetylene black, Ketjen black, channel black, furnace black, lamp black, thermal black, and the like; carbon nanotubes (CNTs) such as single-walled carbon nanotubes (SWCNTs), multi-walled carbon nanotubes (MWCNTs), and the like; carbon fibers such as graphite nanofibers (GNFs), carbon nanofibers (CNFs), activated carbon fibers (ACFs), and the like; and activated charcoal, but the present invention is not limited thereto.

A porous carbon material having a particle diameter of 100 nm to 50 μm may be used as the porous carbon material.

In the sulfur-carbon composite of the present invention, sulfur may comprise one or more selected from the group consisting of inorganic sulfur ($S_8$), $Li_2S_n$ ($n \geq 1$), an organic sulfur compound, and a carbon-sulfur polymer $[(C_2S_x)_n$ where x=2.5 to 50, and $n \geq 2]$. Preferably, inorganic sulfur ($S_8$) may be used.

Also, the sulfur is disposed on a surface of the porous carbon material as well as the inside of the porous carbon material. In this case, the sulfur may be present on a surface of the porous carbon material so that the sulfur accounts for less than 100%, preferably 1 to 95%, and more preferably 60 to 90% of the entire outside surface of the porous carbon material. When the sulfur is present on the surface of the porous carbon material within this surface area range, the sulfur may have the maximum effect in terms of an electron transfer area and the wetness of an electrolyte solution. Specifically, because the sulfur is uniformly impregnated in a surface of the porous carbon material when present within this surface area range, an electron transfer/contact area may increase during a charge/discharge process. When the sulfur is disposed so that the sulfur accounts for 100% of the surface of porous carbon material, the porous carbon material may be completely coated with sulfur, resulting in degraded wetness of the electrolyte solution. Also, the sulfur does not receive electrons due to degraded contact characteristics with a conductive material comprised in an electrode, thereby making it impossible for the sulfur to participate in reactions.

The sulfur-carbon composite may have pores having various sizes in the structure thereof, and thus may be used to support a large content of sulfur due to the pores interconnected three-dimensionally and aligned in a regular manner. As a result, although soluble polysulfides are generated by an electrochemical reaction, when the polysulfides are disposed inside the sulfur-carbon composite, the three-dimensionally entangled structure of the sulfur-carbon composite may be maintained even when the polysulfides flows out of the sulfur-carbon composite, thereby suppressing the breakup of the cathode structure. As a result, the lithium-sulfur battery comprising the sulfur-carbon composite has an advantage in that it may be realized with high capacity even when present in a high loading level. The sulfur-carbon composite according to the present invention may have a sulfur loading level of 1 to 20 mg/cm².

In the sulfur-carbon composite according to the present invention, the weight ratio of the sulfur and the porous carbon material as described above may be in a range of 7.5:2.5 to 4:6, preferably 7.5:2.5 to 6:4. When the content of sulfur is less than this weight ratio range, an amount of an added binder required to prepare a cathode slurry increases with an increasing content of the porous carbon material. An increase in such an added binder eventually increases the sheet resistance of electrodes. In this case, the binder may serve as an insulator interfering with the electron pass, resulting in degraded performance of cells. On the other hand, when the content of sulfur is greater than this weight ratio range, the sulfur may be entangled by itself, and may not easily receive electrons, which makes it difficult to participate directly in an electrode reaction. In particular, the sulfur-carbon composite does not satisfy a pore volume, a specific surface area, and an average pore size, as will be described below.

In general, the porous carbon material may be prepared by carbonizing a precursor made of various carbon materials. In this case, such a porous carbon material may have pores having an average diameter of approximately 40 nm to 70 μm formed therein.

However, in the sulfur-carbon composite of the present invention, a change in sizes of the pores of the porous carbon material may be caused because portions of the inner and outer surfaces of the porous carbon material are coated with sulfur, particularly because the inside of the pores of the porous carbon material is coated with sulfur.

In the case of sulfur-carbon composites prepared by conventional methods, because sulfur particles used for this preparation has a size of several tens of micrometers, such sulfur particles may not be easily introduced into the inside of the pores of the porous carbon material even when the inside of the pores of the porous carbon material is coated with the sulfur particles. Rather, entrances of the pores may be clogged with the sulfur particles. Therefore, a decrease in entrances of the pores may rather be caused while the specific surface area, pore size and pore volume of the sulfur-carbon composite are measured.

However, when the sulfur-carbon composite is manufactured by the method of the present invention, the particles of the porous carbon material may be pulverized. In this case, the sulfur-carbon composite has an effect of preventing a decrease in volume of the pores because a problem of reducing the size of particles is solved. Therefore, the inside of pores of the porous carbon material may be thinly and uniformly coated with sulfur having a particle size of less than 1 micrometer.

Therefore, because a decrease in size of the particles of the porous carbon material may be prevented in the sulfur-carbon composite of the present invention, the sulfur-carbon composite may have a pore volume of 0.180 cm³/g to 0.300 cm³/g, preferably 0.200 cm³/g to 0.250 cm³/g.

Also, because the decrease in size of the particles of the porous carbon material may be prevented, the sulfur-carbon composite may have an average pore size of 40.0 nm to 70.0 nm, preferably 50.0 nm to 65.0 nm.

When the sulfur-carbon composite of the present invention satisfies the pore volume and average pore size ranges, the inside of the pores of the porous carbon material may be thinly and uniformly coated with sulfur. In this case, when the sulfur-carbon composite is applied to electrodes, the electrodes may have excellent discharge capacity and lifespan characteristics. When the sulfur-carbon composite does not satisfy the pore volume and average pore size ranges, the pores may not be coated with sulfur, or the inlets of pores may be clogged with sulfur. As a result, when the sulfur-carbon composite is used in electrodes, the sulfur-carbon composite does not satisfy the discharge capacity and lifespan characteristics required by users.

Method of Manufacturing a Sulfur-Carbon Composite

The sulfur-carbon composite of the present invention may be manufactured by (a) mixing a porous carbon material with sulfur having a particle size of 1 nm to 1 μm using a Henschel mixer; and (b) drying the sulfur/porous carbon material mixture.

First of all, the method of manufacturing a sulfur-carbon composite according to the present invention comprises (a) mixing a porous carbon material with sulfur having a particle size of 1 nm to 1 μm using a Henschel mixer.

In step (a), when the sulfur and the porous carbon material are mixed, a weight ratio of the sulfur and the porous carbon material may be in a range of 7.5:2.5 to 4:6, preferably 7.5:2.5 to 6:4. When the content of sulfur is less than the weight ratio range, an amount of an added binder required to prepare a cathode slurry increases with an increasing content of the porous carbon material. An increase in such an added binder eventually increases the sheet resistance of electrodes. In this case, the binder may serve as an insulator interfering with the electron pass, resulting in degraded performance of cells. On the other hand, when the content of sulfur is greater than this weight ratio range, the sulfur may be entangled by itself, and may not easily receive electrons, which makes it difficult to participate directly in an electrode reaction. In particular, the sulfur-carbon composite does not satisfy a pore volume, a specific surface area, and an average pore size, as will be described below.

The Henschel mixer used in the present invention refers to machine equipment that uniformly stirs and blends materials while rotating a specially tailored impeller as shown in FIG. 1 at a high speed. In the present invention, the Henschel mixer is used to mix the sulfur and the porous carbon material.

To manufacture the sulfur-carbon composite comprised in the cathode active material of the lithium-sulfur battery, dry-mixing of the sulfur and the carbon material by means of a ball-milling process is mainly used in the art. When the sulfur and the carbon material are mixed through such a ball milling process, carbon particles may be unduly pulverized during mixing of sulfur and carbon, thereby reducing the size of the carbon particles, which results in a decrease in volume of pores.

The mixing by the Henschel mixer of the present invention may be performed at a speed of 500 to 3000 rpm. When the mixing is performed at a speed less than this speed range, the sulfur and the porous carbon material are not mixed thoroughly, resulting in degraded efficiency of batteries. On the other hand, when the mixing is performed at a speed greater than this speed range, the particles of the porous carbon material may be pulverized, resulting in decreased pore volume of the carbon material. Therefore, the mixing speed is adjusted within this speed range. The particle size is easily controlled within this range of the mixing speed, and a particle size distribution of the sulfur-carbon composite disclosed herein may be achieved.

The mixing by the Henschel mixer of the present invention may be performed for 15 minutes to 3 hours. When the mixing is performed for a period less than this time range, the sulfur and the porous carbon material are not mixed thoroughly, resulting in degraded efficiency of batteries. On the other hand, when the mixing is performed for a period greater than this time range, the particles of the porous carbon material may be pulverized due to the excessive mixing, resulting in decreased pore volume of the carbon material. Therefore, the mixing time is adjusted within this time range.

The sulfur-carbon composite according to the present invention may have particle size distributions d90, d10, and d50 of 100 μm to 140 μm, 7 μm to 15 μm, and 30 μm to 70 μm, respectively, and preferably particle size distributions d90, d10, and d50 of 110 μm to 130 μm, 8 μm to 12 μm, and 40 μm to 60 μm, respectively, because the sulfur and the porous carbon material are mixed at this speed range by means of the Henschel mixer.

As disclosed herein, the d10, d90 and d50 refer to particle sizes measured at points of 10%, 90% and 50% from the smallest particle size in the particle size distribution, respectively.

The sulfur used in step (a) has a particle size of 1 nm to 1 μm, and has the same characteristics as described above. Also, the characteristics of the porous carbon material are as described above.

Next, the method of manufacturing a sulfur-carbon composite according to the present invention comprises (b) drying the sulfur/porous carbon material mixture.

The drying method may be performed for 15 minutes to 2 hours in an oven at 130° C. to 180° C.

Therefore, in the sulfur-carbon composite manufactured by the method of manufacturing a sulfur-carbon composite according to the present invention, when sulfur and carbon are mixed by the Henschel mixer, the sulfur-carbon composite may have a pore volume of 0.180 $cm^3/g$ to 0.300 $cm^3/g$, preferably 0.200 $cm^3/g$ to 0.250 $cm^3/g$, and an average pore size of 40.0 nm to 70.0 nm, preferably 50.0 nm to 65.0 nm.

Cathode for Lithium-Sulfur Batteries

The sulfur-carbon composite provided in the present invention may be preferably used as the cathode active material for lithium-sulfur batteries.

The cathode is manufactured by applying a composition for forming a cathode active material layer onto a cathode current collector and drying the cathode current collector.

Specifically, to endow the manufacture sulfur-carbon composite with additional conductivity, the cathode composition may further comprise a conductive material. The conductive material serves to promote the transfer of electrons into a cathode, and is not particularly limited as long as the conductive material exhibits excellent conductivity and has a wide surface area without causing a chemical change in batteries. Preferably, a carbon-based material is used.

The carbon-based material that may be used herein comprises one or more selected from the group consisting of graphite-based materials such as natural graphite, artificial graphite, expandable graphite, graphene; active carbon-based materials; carbon black-based materials such as channel black, furnace black, thermal black, ketjen black, lamp black, acetylene black; carbon fiber-based materials; carbon nanostructures such as carbon nanotubes (CNT), fullerene; and combinations thereof.

In addition to the carbon-based materials, metallic fibers such as metal meshes, and the like; metallic powders such as copper (Cu), silver (Ag), nickel (Ni), aluminum (Al), and the like; or organic conductive materials such as polyphenylene derivatives, and the like may also be used according to a purpose. The conductive materials may be used alone or in combination.

Also, to provide the cathode active material with adhesion to a current collector, the cathode composition may further comprise a binder. The binder should be easily dissolved in a solvent, and easily form a conductive network between a cathode active material and a conductive material, and have an impregnation property in an electrolyte solution as well.

Binders applicable to the present invention may be all types of binders known in the related art. Specifically, the binder may be one or a mixture or copolymer of two or more selected from the group consisting of fluorine resin-based binders comprising polyvinylidene fluoride (PVdF) or polytetrafluoroethylene (PTFE); rubber-based binders comprising a styrene-butadiene rubber, an acrylonitrile-butadiene rubber, a styrene-isoprene rubber; cellulose-based binders comprising carboxymethyl cellulose (CMC), starch, hydroxypropyl cellulose, regenerated cellulose; polyalcohol-based binders; polyolefin-based binders comprising polyethylene, polypropylene; polyimide-based binders; polyester-based binders; and silane-based binders, but the present invention is not limited thereto.

A content of the binder resin may be in a range of 0.5 to 30% by weight, based on the total weight of the cathode for lithium-sulfur batteries, but the present invention is not limited thereto. When the content of the binder resin is less than 0.5% by weight, the cathode active material and the conductive material may be eliminated due to degraded physical properties of the cathode. On the other hand, when the content of the binder resin is greater than 30% by weight, the battery capacity may be degraded due to a relative decrease in ratio of the active material and the conductive material in the cathode.

A solvent used to prepare a cathode composition for lithium-sulfur batteries in a slurry phase should be easily dried, and may be used to dissolve a binder easily. In this case, the cathode active material and the conductive material are most preferably maintained in a dispersed state without being dissolved. When the cathode active material is dissolved in the solvent, sulfur has a high specific gravity (D=2.07) in the slurry so that the sulfur settles down in the slurry. As a result, because sulfur may converge around the current collector during a coating process, problems may be caused in the conductive network, which leads to operational problems in batteries.

The solvent according to the present invention may be water or an organic solvent, and an organic solvent comprising one or more selected from the group consisting of dimethylformamide, isopropyl alcohol, acetonitrile, methanol, ethanol, tetrahydrofuran, and the like may be used as the organic solvent.

The mixing of the cathode composition may be performed while stirring using a conventional mixer, for example a Latte's mixer, a high-shear mixer, a homo-mixer, and the like.

The cathode composition may be applied to the current collector, and dried under vacuum to form a cathode for lithium-sulfur batteries. The current collector may be coated to a proper thickness with the slurry, depending on the viscosity of the slurry and the thickness of the cathode to be formed. Preferably, the thickness of the current collector may be properly selected within a range of 10 μm to 300 μm.

In this case, a method of coating the slurry is not limited. For example, the coating may be performed using a method such as doctor blade coating, dip coating, gravure coating, slit die coating, spin coating, comma coating, bar coating, reverse roll coating, screen coating, cap coating, and the like.

The cathode current collector may be generally manufactured to a thickness of 3 μm to 500 μm, and are not particularly limited as long as it has high conductivity without causing a chemical change in batteries. For example, conductive metals such as stainless steel, aluminum, copper, titanium, and the like may be used. Preferably, an aluminum current collector may be used. Such a cathode current collector may be realized in various forms such as films, sheets, foil, nets, porous bodies, foams, or non-woven fabrics.

Lithium-Sulfur Battery

As one exemplary embodiment of the present invention, lithium-sulfur battery may comprise the aforementioned cathode for lithium-sulfur batteries; an anode comprising a lithium metal or a lithium alloy as an anode active material; separator interposed between the cathode and the anode; and an electrolyte impregnated into the anode, the cathode and the separator and comprising a lithium salt and an organic solvent.

For the anode, a material enabling reversible intercalation or deintercalation of lithium ions ($Li^+$), a material capable of reacting with lithium ions to reversibly form a lithium-containing compound, a lithium metal, or a lithium alloy may be used as the anode active material. For example, the material enabling reversible intercalation or deintercalation of lithium ions may be crystalline carbon, amorphous carbon, or a mixture thereof. For example, the material capable of reacting with lithium ions to reversibly form a lithium-containing compound may be tin oxide, titanium nitrate, or silicone. For example, the lithium alloy may be an alloy of lithium and a metal selected from the group consisting of Na, K, Rb, Cs, Fr, Be, Mg, Ca, Sr, Ba, Ra, Al, and Sn.

Also, in a process of charging/discharging the lithium-sulfur battery, sulfur used as the cathode active material may be converted into an inactive material, which may then be attached to a surface of a lithium anode. As such, inactive sulfur refers to sulfur which can no longer participate in an electrochemical reaction of the cathode because it has undergone various electrochemical or chemical reactions. Accordingly, the inactive sulfur formed on the surface of the lithium anode also has an advantage in that it serves as a protective layer of the lithium anode. Therefore, a lithium metal and inactive sulfur (such as lithium sulfide) formed on the lithium metal may also be used as the anode.

In addition to the anode active material, the anode of the present invention may further comprise a pretreatment layer made of a lithium ion conductive material, and a lithium metal-protecting layer formed on the pretreatment layer.

The separator interposed between the cathode and the anode serves to separate or insulate the cathode and the anode from each other and allow the transfer of lithium ions between the cathode and the anode, and may be made of a porous non-conductive or insulating material. Such a separator is an insulator having high ion permeability and mechanical strength. In this case, the separator may be a separate member such as a thin film or a film, and may also be a coating layer added to the cathode and/or anode. Also, when a solid electrolyte such as a polymer is used as the electrolyte, the solid electrolyte may serve as the separator as well.

Generally, the separator preferably has a pore diameter of 0.01 μm to 10 μm and a thickness of 5 μm to 300 μm. A glass electrolyte, a polymer electrolyte, or a ceramic electrolyte may be used as such a separator. For example, sheets, non-woven fabrics, or kraft papers, all of which are made of olefin-based polymers (such as chemically resistant and hydrophobic polypropylene, etc.), glass fibers, or polyethylenes, are used. Representative examples of commercially available separators comprise Celgard® series (Celgard® 2400, 2300 commercially available from Hoechest Celanese Corp.), polypropylene separators (commercially available from Ube Industries Ltd. or Pall RAI), polyethylene series (Tonen or Entek), and the like.

The electrolyte separator in a solid phase may also comprise less than approximately 20% by weight of a non-aqueous organic solvent. In this case, the electrolyte separator may further comprise a proper gelling agent to reduce the fluidity of the organic solvent. Representative examples of such a gelling agent comprise polyethylene oxide, polyvinylidene fluoride, polyacrylonitrile, and the like.

The electrolyte impregnated into the anode, the cathode and the separator is a non-aqueous electrolyte containing a lithium salt, and is composed of a lithium salt and an electrolyte solution. In this case, a non-aqueous organic solvent, an organic solid electrolyte, and an inorganic solid electrolyte are used as the electrolyte solution.

The lithium salt of the present invention is a material that is easily dissolved in a non-aqueous organic solvent, and may, for example, comprise one or more selected from the group consisting of LiSCN, LiCl, LiBr, LiI, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $LiC(CF_3SO_2)_3$, $LiN(FSO_2)_2$, LiN(CF$_3$SO$_2$)$_2$, LiN(C$_2$F$_5$SO$_2$)$_2$, LiN(SFO$_2$)$_2$, LiN(CF$_3$CF$_2$SO$_2$)$_2$, chloroboran lithium, lower aliphatic lithium carbonate, lithium tetraphenylborate, lithium imide, and combinations thereof.

A concentration of the lithium salt may be in a range of 0.2 to 2 M, particularly 0.6 to 2 M, and more particularly 0.7 to 1.7 M, depending on various factors such as an exact composition of the electrolyte mixture, the solubility of the salt, the conductivity of a salt to be dissolved, the charge/discharge conditions for batteries, the working temperature, and other factors known in the field of lithium batteries. When the lithium salt is used at a concentration of less than 0.2 M, the performance of an electrolyte may be degraded due to a drop in conductivity of the electrolyte. On the other hand, when the lithium salt is used at a concentration of greater than 2 M, the mobility of lithium ions (Li$^+$) may be reduced due to an increase in viscosity of the electrolyte.

The non-aqueous organic solvent should serve to dissolve the lithium salt sufficiently. For example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxy ethane, 1,2-diethoxy ethane, tetrahydrofuran, 2-methyl tetrahydrofuran, dimethyl sulfoxide, 1,3-dioxolane, 4-methyl-1,3-dioxane, diethyl ether, formamide, dimethylformamide, dioxolane, acetonitrile, nitromethane, methyl formate, methyl acetate, phosphate triester, trimethoxy methane, dioxolane derivatives, sulforane, methyl sulforane, 1,3-dimethyl-2-imidazolidinone, propylene carbonate derivatives, tetrahydrofuran derivatives, ether, methyl propionate, ethyl propionate, and the like may be used as the non-aqueous organic solvent of the present invention. In this case, the organic solvent may be one organic solvent or a mixture of two or more organic solvents.

For example, polyethylene derivatives, polyethylene oxide derivatives, polypropylene oxide derivatives, phosphate ester polymers, polyalginate lysine, polyester sulfide, polyvinyl alcohols, polyvinylidene fluoride, and polymers containing ionic dissociation groups may be used as the organic solid electrolyte.

For example, nitrides, halides, sulfate, and the like of Li such as Li$_3$N, LiI, Li$_5$NI$_2$, Li$_3$N—LiI—LiOH, LiSiO$_4$, LiSiO4-LiI—LiOH, Li$_2$SiS$_3$, Li$_4$SiO$_4$, Li$_4$SiO$_4$—LiI—LiOH, Li$_3$PO4-Li$_2$S—SiS$_2$, and the like may be used as the inorganic solid electrolyte.

To improve the charge/discharge characteristics, flame retardancy, and the like, for example, pyridine, triethylphosphite, triethanolamine, cyclic ether, ethylenediamine, n-glyme, hexamethylphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may also be added to the electrolyte solution of the present invention. When necessary, the electrolyte solution may further comprise a halogen-containing solvent such as carbon tetrachloride, ethylene trifluoride, or the like in order to impart incombustibility. Also, the electrolyte solution may further comprise carbon dioxide gas in order to improve high-temperature preservative characteristics, and may also further comprise fluoroethylene carbonate (FEC), propene sultone (PRS), fluoropropylene carbonate (FPC), and the like.

The electrolyte may be used as a liquid-phase electrolyte, and may also be used in the form of a solid-phase electrolyte separator. When the electrolyte is used as a liquid-phase electrolyte, separators made of porous glass, plastics, ceramics, or polymers are further comprised as physical separators serving to physically separate the electrode.

MODE FOR INVENTION

Hereinafter, the present invention will be described in further detail with reference to examples thereof. However, it should be understood that the scope and contents of the present invention are not intended to be construed as reducing or limiting by the following examples. Also, it will also be apparent that a person having ordinary still in the art may easily put this invention, in which experimental results are not specifically provided, into practice based on the disclosure of the present invention comprising the following examples, and that such changes and modifications fall within the appended claims.

EXAMPLES

Manufacture of sulfur-carbon composite

Example 1

78 g of sulfur and 30 g of carbon were put into a 1 L Henschel mixer, and mixed for an hour at 1,500 rpm. The sulfur/carbon mixture was dried for 30 minutes in an oven at 155° C. to manufacture a sulfur-carbon composite.

Comparative Example 1

270 g of ZrO$_2$ balls having a diameter of 5 mm, 23.4 g of sulfur, and 9 g of carbon were put into a 1 L container, and ball-milled at 200 rpm for 3 minutes to mix the sulfur and the carbon. Thereafter, the mixture was heated for 30 minutes in an oven at 155° C. to manufacture a sulfur-carbon composite.

Experimental Example 1: Evaluation of Physical Properties of Composites (SEM Analysis and Particle Size Analysis Results)

Images of the sulfur-carbon composites manufactured in Example 1 and Comparative Example 1 were taken under a scanning electron microscope (SEM, S-4800, HITACHI), and are shown in FIGS. 2 and 3.

Also, the average particle sizes (d10, d90 and d50) of the sulfur-carbon composites manufactured in Example 1 and Comparative Example 1 were determined in a range of 0.4 μm to 2,000 μm using a particle size analyzer (Beckman Coulter LS13320 Lase diffraction particle size analyzer model). The results are listed in Table 1.

TABLE 1

|  | Particle size (μm) | | |
| --- | --- | --- | --- |
|  | d10 | d50 | d90 |
| Example 1 | 9.02 | 55.8 | 122.0 |
| Comparative Example 1 | 6.72 | 18.2 | 33.6 |

As shown in FIGS. 2 and 3, it can be seen that the sulfur-carbon composite of Example 1 contained a number of large particles having a particle size of 100 μm or more, but the sulfur-carbon composite of Comparative Example 1 contained most particles having a particle size of 30 μm or less.

(Comparison of Pore Structures)

The pore sizes, specific surface areas, and pore volumes of the sulfur-carbon composites manufactured in Example 1 and Comparative Example 1 were measured using a nitrogen adsorption system (BELSorp, BEL). The results are listed in Table 2 and shown in FIG. 4.

TABLE 2

|  | Specific surface area (m²/g) | Pore volume (cm³/g) | Average pore (nm) |
| --- | --- | --- | --- |
| Example 1 | 16.09 | 0.237 | 58.8 |
| Comparative Example 1 | 18.75 | 0.160 | 34.1 |

Based on the readings listed in Table 2 and shown in FIG. 4, it can be seen that both of the pore volume and average pore of the sulfur-carbon composite manufactured in Example 1 were increased.

Experimental Example 2: Evaluation of Physical Properties of Batteries (Manufacture of Batteries)

Each of the sulfur-carbon composite manufactured in Example 1 and Comparative Example 1, a binder (poly (lithium acrylate) (LiPAA)/polyvinyl alcohol (PVA) mixed at 6.5:0.5), and a conductive material (Vapor Grown Carbon Fiber (VGCF)) were mixed at a weight ratio of 88:7:5 to prepare a slurry. Thereafter, a current collector made of aluminum foil having a thickness of 20 μm was coated with the slurry to manufacture an electrode.

A coin cell was manufactured using the manufactured electrode and a lithium metal as a cathode and an anode, respectively. In this case, an electrolyte solution prepared from 2-Me-THF/DOL/DME (1:1:1), 1 M LiN(CF$_3$SO$_2$)$_2$ (LiTFSI), and 0.1 M LiNO$_3$ was used in the coin cell. As the solvents used, 2-Me-THF, DOL, and DME represent 2-methyl tetrahydrofuran, dioxolane, and dimethyl ether, respectively.

The capacities of the manufacture coin cells were measured in a range of 1.5 to 2.8 V. The results are listed in Table 3 and shown in FIG. 5.

TABLE 3

| Items | Discharge capacity [mAh/g] |
| --- | --- |
| Example 1 | 1,116 |
| Comparative Example 1 | 1,070 |

As shown in Table 3 and FIG. 5, it can be seen that the overvoltage of Example 1 was reduced and the initial discharge capacity was improved in the case of Comparative Example 1 and Example 1 having the same sulfur:carbon ratio.

Also, the manufactured coin cells were charged at 0.1 C rate CC and discharged at 0.1 C rate CC for 2.5 cycles, repeatedly changed/discharged for 3 cycles at 0.2 C/0.2 C, and then repeatedly changed/discharged for 70 cycles at 0.3 C/0.5 C to measure the charge/discharge efficiencies. (CC: Constant Current)

The results were able to be confirmed as shown in FIG. 6, and it can be seen that the lifespan characteristics of Example 1 were improved, compared to those of Comparative Example 1.

The invention claimed is:

1. A sulfur-carbon composite comprising:
a porous carbon material; and
sulfur,
wherein at least a portion of an inside and a surface of the porous carbon material is coated with the sulfur,
the sulfur-carbon composite has a pore volume of 0.180 cm³/g to 0.300 cm³/g, and
the sulfur-carbon composite has an average pore size of 40.0 nm to 70.0 nm,
wherein the sulfur-carbon composite has particle size distributions d90, d10, and d50 of 100 μm to 140 μm, 7 μm to 15 μm, and 30 μm to 70 μm, respectively.

2. The sulfur-carbon composite of claim 1, wherein the sulfur-carbon composite has a pore volume of 0.200 cm³/g to 0.250 cm³/g, and
the sulfur-carbon composite has an average pore size of 50.0 nm to 65.0 nm.

3. The sulfur-carbon composite of claim 1, wherein the porous carbon material is in a form of a particle and has a diameter of 100 nm to 50 μm.

4. The sulfur-carbon composite of claim 1, wherein the sulfur and the porous carbon material are present in the sulfur-carbon composite at a weight ratio of 7.5:2.5 to 4:6.

5. The sulfur-carbon composite of claim 1, wherein the porous carbon material comprises one or more selected from the group consisting of graphite, graphene, carbon black, carbon nanotubes, carbon fibers, and activated charcoal.

6. A cathode for lithium-sulfur batteries comprising the sulfur-carbon composite defined in claim 1.

7. A lithium-sulfur battery comprising the cathode defined in claim 6; an anode; and an electrolyte.

8. A method of manufacturing a sulfur-carbon composite according to claim 1, comprising:
(a) mixing a porous carbon material with sulfur particles, wherein the sulfur particles have a particle size of 1 nm to 1 μm using a Henschel mixer; and
(b) drying the resulting mixture of (a).

9. The method of claim 8, wherein the mixing by the Henschel mixer is carried out at a rate of 500 rpm to 3,000 rpm.

10. The method of claim 8, wherein the mixing by the Henschel mixer is carried out for 15 minutes to 3 hours.

11. The method of claim 8, wherein the sulfur-carbon composite has particle size distributions d90, d10, and d50 of 110 μm to 130 μm, 8 μm to 12 μm, and 40 μm to 60 μm, respectively.

12. The method of claim 8, wherein the porous carbon material comprises one or more selected from the group consisting of graphite, graphene, carbon black, carbon nanotubes, carbon fibers, and activated charcoal.

13. The method of claim 8, wherein the drying in step (b) is carried out at 130° C. to 180° C. for 15 minutes to 2 hours in an oven.

14. The method of claim 8, wherein the sulfur and the porous carbon material are present in the sulfur-carbon composite at a weight ratio of 7.5:2.5 to 4:6.

* * * * *